(12) United States Patent
Tsutsui et al.

(10) Patent No.: US 8,864,157 B2
(45) Date of Patent: Oct. 21, 2014

(54) REAR PORTION STRUCTURE FOR A SADDLE TYPE VEHICLE

(71) Applicant: Honda Motor Co., Ltd., Tokyo (JP)

(72) Inventors: Noriyoshi Tsutsui, Wako (JP); Yoichi Nishida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/967,805

(22) Filed: Aug. 15, 2013

(65) Prior Publication Data

US 2014/0062058 A1   Mar. 6, 2014

(30) Foreign Application Priority Data

Aug. 31, 2012   (JP) ................. 2012-192328

(51) Int. Cl.
*B62J 15/00* (2006.01)
*B62K 11/02* (2006.01)
*B62J 6/18* (2006.01)
*B62K 11/04* (2006.01)
*B62K 19/46* (2006.01)

(52) U.S. Cl.
CPC . *B62K 11/02* (2013.01); *B62J 6/18* (2013.01); *B62K 11/04* (2013.01); *B62K 19/46* (2013.01); *B62J 15/00* (2013.01)
USPC ........ 280/152.1; 280/154; 224/413; 224/429; 180/219

(58) Field of Classification Search
CPC ............. B62J 1/00; B62J 1/002; B62J 1/005; B62J 1/007; B62J 1/08; B62D 25/16; B62D 15/163–15/166; B62K 11/00; B62K 11/02
USPC ............. 297/195.1, 195.11–195.13; 280/154; 180/219
See application file for complete search history.

(56) References Cited

U.S. PATENT DOCUMENTS

| | | | | |
|---|---|---|---|---|
| 3,913,974 A | * | 10/1975 | Bowen ..................... | 297/195.12 |
| 4,311,261 A | * | 1/1982 | Anderson et al. ............. | 224/418 |
| 4,460,057 A | * | 7/1984 | Kohyama ...................... | 180/210 |
| 4,469,190 A | * | 9/1984 | Yamaguchi .................. | 180/219 |
| 4,577,719 A | * | 3/1986 | Nomura et al. ............... | 180/219 |

(Continued)

FOREIGN PATENT DOCUMENTS

| | | |
|---|---|---|
| EP | 0 602 590 A1 | 6/1994 |
| EP | 2 302 716 A1 | 3/2011 |
| JP | 4216965 B2 | 1/2009 |

*Primary Examiner* — Jeffrey J Restifo
*Assistant Examiner* — Erez Gurari
(74) *Attorney, Agent, or Firm* — Birch, Stewart, Kolasch & Birch, LLP (57) ABSTRACT

A rear portion structure for a saddle vehicle includes a wide accommodation space for accommodating parts therein while improving the foot grounding property of a rider. A rear fender of a motorcycle has a bottom wall disposed on the inner side of a rear frame in the vehicle widthwise direction, and left and right side walls extending upwardly from the bottom wall. An accommodation space for accommodating a part therein is formed from the bottom wall and the left and right side walls. Left and right first bending portions which individually extend in a longitudinal direction of the vehicle and at which the left and right side walls can individually be bent with respect to the bottom wall are formed between the bottom wall and the left and right side walls. The left and right side walls are inclined inwardly and upwardly along the inner side of the rear frame.

20 Claims, 7 Drawing Sheets

(56) References Cited

U.S. PATENT DOCUMENTS

| | | | |
|---|---|---|---|
| 4,958,451 A * | 9/1990 | Iwakura et al. | 40/204 |
| 5,377,776 A * | 1/1995 | Saiki | 180/219 |
| 5,433,286 A * | 7/1995 | Kumamaru et al. | 180/219 |
| 6,257,362 B1 * | 7/2001 | Scherbarth | 180/219 |
| 6,273,207 B1 * | 8/2001 | Brown | 180/219 |
| 6,318,743 B1 * | 11/2001 | Nakashima et al. | 280/152.1 |
| 6,585,072 B2 * | 7/2003 | Scherbarth | 180/219 |
| 6,860,359 B2 * | 3/2005 | Tanabe et al. | 180/309 |
| 7,004,276 B2 * | 2/2006 | Iizuka et al. | 180/89.17 |
| 7,036,837 B1 * | 5/2006 | Bauer et al. | 280/288.4 |
| 7,111,903 B1 * | 9/2006 | Snelson | 297/256.16 |
| 7,252,170 B2 * | 8/2007 | Miyakozawa et al. | 180/219 |
| 7,448,664 B2 * | 11/2008 | Karube et al. | 296/65.03 |
| 7,523,981 B2 * | 4/2009 | Karube et al. | 296/198 |
| 7,537,271 B2 * | 5/2009 | Hlopick et al. | 296/181.2 |
| 7,635,140 B2 * | 12/2009 | Konno et al. | 280/152.1 |
| 7,648,169 B2 * | 1/2010 | Kobayashi | 280/784 |
| 7,857,341 B2 * | 12/2010 | Kobayashi et al. | 280/304.5 |
| 7,905,506 B2 * | 3/2011 | Ishikawa et al. | 280/291 |
| 7,934,744 B2 * | 5/2011 | Suzuki et al. | 280/728.2 |
| 7,971,672 B2 * | 7/2011 | Kubo et al. | 180/219 |
| 8,016,308 B2 * | 9/2011 | Ishikawa et al. | 280/152.1 |
| 8,342,282 B2 * | 1/2013 | Kuramochi et al. | 180/219 |
| 8,387,736 B2 * | 3/2013 | Ishii et al. | 180/219 |
| 8,448,737 B2 * | 5/2013 | Hasegawa | 180/219 |
| 8,459,393 B2 * | 6/2013 | Yamamoto | 180/219 |
| 8,469,132 B2 * | 6/2013 | Noichi | 180/219 |
| 8,534,407 B2 * | 9/2013 | Koda et al. | 180/219 |
| 8,550,200 B2 * | 10/2013 | Hori et al. | 180/219 |
| 2002/0125749 A1 * | 9/2002 | Ashida et al. | 297/195.1 |
| 2004/0212169 A1 * | 10/2004 | Takemura et al. | 280/152.1 |
| 2006/0061157 A1 * | 3/2006 | Yokomizo | 297/214 |
| 2007/0216132 A1 * | 9/2007 | Ozawa | 280/304.5 |
| 2008/0110688 A1 * | 5/2008 | Miyashiro et al. | 180/311 |
| 2008/0121455 A1 * | 5/2008 | Ishida | 180/219 |
| 2009/0050386 A1 * | 2/2009 | Nobuhira | 180/68.2 |
| 2009/0242304 A1 * | 10/2009 | Tahara et al. | 180/219 |
| 2012/0126589 A1 * | 5/2012 | Kawatani et al. | 297/195.12 |
| 2012/0145470 A1 * | 6/2012 | Fujiyama | 180/219 |
| 2014/0035332 A1 | 2/2014 | Winefordner | |
| 2014/0131127 A1 | 5/2014 | Hayama | |

* cited by examiner

REAR PORTION STRUCTURE FOR A SADDLE TYPE VEHICLE

CROSS-REFERENCE TO RELATED APPLICATIONS

The present application claims priority under 35 USC 119 to Japanese Patent Application No. 2012-192328 filed Aug. 31, 2012 the entire contents of which are hereby incorporated by reference.

BACKGROUND OF THE INVENTION

1. Field of the Invention

The present invention relates to improvements in a rear portion structure for a saddle type vehicle.

2. Description of Background Art

An accommodation structure for a saddle type vehicle which is limited in disposition space for parts and articles has been proposed which includes a disposition space for parts provided above a rear fender below a seat on which a rider is to be seated. See, for example, Japanese Patent No. 4216965 (FIG. 6).

As shown in the FIG. 6 of Japanese Patent No. 4216965, below a seat supported by a pair of left and right seat rails (38) (a reference character in parentheses represents a reference character used in Japanese Patent No. 4216965) a battery accommodation section (87) is provided. This battery accommodation section (87) is configured from a pair of left and right side plates (82) and a bottom plate (83) extending between lower ends of the left and right paired side plates (82). The side plates (82) and the bottom plate (83) are formed integrally with a rear fender (46). The rear fender (46) is a molded resin part (Japanese Patent No. 4216965, paragraph number [0032]).

In particular, the side plates (82) of the battery accommodation section (87) first extend upwardly from the bottom plate (83) and then extend outwardly in a vehicle widthwise direction once, and then extend upwardly at outer positions with respect to the seat rails (38) in such a manner as to bypass the seat rails (38). On such side plates (82) as described above, a partition wall (89) is provided which is branched at an inner position with respect to the seat rails (38) in the vehicle widthwise direction and extends upwardly. A wiring groove (90), along which wire harnesses (91, 92) pass, is formed between the partition wall (89) and upper portions of the side plates (82).

Since the rear fender (46) is a molded resin part, also the battery accommodation section (87) is a molded resin part. A molded resin part is generally fabricated by injection molding using a metal mold. In order to smoothly release the molded article from the metal mold, it is necessary to set the distance between the left and light side plates (82) which become molded articles such that it is equal to the width of the bottom plate (83) or it increases upwardly such that it becomes greater than the width of the bottom plate (83).

Here, a structure wherein the left and right side plates (82) extend vertically upwardly from the end portions of the bottom plate (83) and another structure wherein the side plates (82) extend obliquely upwardly outwards in the vehicle widthwise direction from the end portions of the bottom plate (83) are compared with each other in terms of the accommodation space (space) for accommodating parts and so forth and the foot grounding property of a rider.

Where the width of the bottom plate is equal, if the structure wherein the left and right side plates (82) extend vertically upwardly from the end portions of the bottom plate (83) is applied, then it is easy to decrease the width of the seat in the proximity of the upper ends of the side plates in comparison with the structure wherein the side plates (82) extend obliquely upwardly outwards in the vehicle widthwise direction from the end portions of the bottom plate (83). Therefore, since the width of the seat decreases, the accommodation space decreases although the foot grounding property of a rider is enhanced.

On the other hand, if the structure wherein the side plates (82) extend obliquely upwardly outwards in the vehicle widthwise direction from the end portions of the bottom plate (83) is applied, then the accommodation space can be increased readily in comparison with the structure wherein the left and right side plates (82) extend vertically upwardly from the end portions of the bottom plate (83). However, this increases the width of the seat, and room is left for improvement in the foot grounding property of a rider.

However, while further improvement is demanded for a saddle type vehicle, a rear portion structure for a saddle type vehicle is demanded which can satisfy both of the foot grounding property of a rider and assurance of an accommodation space for accommodating parts.

SUMMARY AND OBJECTS OF THE INVENTION

It is a problem of the present invention to provide a rear portion structure for a saddle type vehicle wherein a wide accommodation space for accommodating parts therein can be assured while the foot grounding property of a rider is improved.

According to an embodiment of the present invention, there is provided a rear portion structure for a saddle type vehicle wherein a rear frame is configured from a pair of left and right seat rails which support a seat on which a rider is to be seated. A pair of left and right support frames are disposed below and on the outer sides in a vehicle widthwise direction with respect to the paired left and right seat rails for supporting the paired left and right seat rails thereon. A rear fender for avoiding mud splashed by a rear wheel is provided on the rear frame. The rear fender has a bottom wall disposed on the inner side of the rear frame in the vehicle widthwise direction and left and right side walls extending upwardly from the bottom wall, respectively. An accommodation space for accommodating a part therein is formed from the bottom wall and the left and right side walls. Left and right first bending portions that individually extend in a longitudinal direction of the vehicle and at which the left and right side walls can individually be bent with respect to the bottom wall are formed between the bottom wall and the left and right side walls, and the left and right side walls are inclined inwardly and upwardly along the inner side of the rear frame.

According to an embodiment of the present invention, the rear portion structure for a saddle type vehicle is configured such that the left and right first bending portions are disposed on the inner side in the vehicle widthwise direction with respect to the left and right support frames, respectively.

According to an embodiment of the present invention, the rear portion structure for a saddle type vehicle is configured such that left and right supporting portions that extend to and engage with the bottom wall and support the left and right side walls at a predetermined inclination angle are formed integrally on the left and right side walls.

According to an embodiment of the present invention, the rear portion structure for a saddle type vehicle is configured such that the left and right supporting portions have left and right connection arm portions connected to the left and right side walls and extending from the left and right side walls, respectively, and left and right second bending portions which individually extend in the longitudinal direction of the vehicle between the left and right second bending portions and the left and right side walls and at which the left and right connection arm portions can be bent with respect to the left and right side walls, respectively. Ends of the left and right connection arm portions are inserted in left and right openings formed in the bottom wall.

According to an embodiment of the present invention, the rear portion structure for a saddle type vehicle is configured such that the left and right second bending portions are disposed on the inner side of the left and right seat rails in the vehicle widthwise direction.

According to an embodiment of the present invention, the rear portion structure for a saddle type vehicle is configured such that abutting portions each in the form of a flat face are formed on the left and right connection arm portions. Abutted faces that can abut in a plane with the abutting portions are integrally formed on the bottom plate.

According to an embodiment of the present invention, the rear portion structure for a saddle type vehicle is configured such that the left and right side walls are plate-like members individually extending in the longitudinal direction of the vehicle. Left and right inner walls which extend in the heightwise direction and besides extend in the longitudinal direction of the vehicle are formed on the rear fender on the inner side in the vehicle widthwise direction with respect to the first bending portions. Left and right harness guides which individually guide electric cables are formed from the left and right inner walls with the left and right side walls bent at the left and right first bending portions, respectively.

According to an embodiment of the present invention, the rear portion structure for a saddle type vehicle is configured such that all of the first bending portions and the second bending portions have a reduced thickness from that of the other portions.

According to an embodiment of the present invention, the accommodation space for accommodating a part therein is formed from the bottom wall and the left and right side walls in the rear fender. The left and right side walls are disposed such that they are inclined inwardly and upwardly along the inner side of the rear frame. In other words, the left and right side walls are inclined downwardly and outwardly such that the width thereof increases downwardly. Therefore, the accommodation space can be widened in comparison with that in an alternative case in which the left and right side walls extend downwardly without being inclined outwardly.

Since the left and right side walls are formed such that the distance therebetween decreases upwardly, the seat width can be reduced. When the seat width is reduced, the foot grounding property of the rider is enhanced.

As a result, the foot grounding property is improved and the accommodation space for parts can be assured wide.

Further, the left and right side walls are inclined with respect to the bottom wall to configure the accommodation space in the rear fender making use of the left and right vulnerable portions provided by the bending portions. Since the accommodation space can be formed by bending the left and right side walls at the left and right first bending portions, a molding metal mold for the rear fender can be simplified. Further, since the bottom wall and the left and right side walls are molded integrally, the assembly property of the rear fender can be enhanced and the number of parts can be reduced. Consequently, reduction of the vehicle cost can be anticipated.

According to an embodiment of the present invention, the left and right first bending portions being disposed on the inner side in the vehicle widthwise direction with respect to the left and right support frames, respectively. By disposing the first bending portions on the inner side with respect to the left and right support frames, the left and right first bending portions can be protected by the left and right support frames, respectively.

According to an embodiment of the present invention, the left and right supporting portions which extend to and engage with the bottom wall are formed integrally on the left and right side walls, respectively. By the left and right supporting portions, the left and right side walls are supported at the predetermined inclination angle on the bottom wall, respectively. By the left and right supporting portions extending integrally from the left and right side walls, the left and right side walls can be supported in a state in which they are inclined at the predetermined angle inwardly in the vehicle widthwise direction without giving rise to increase of the number of parts.

According to an embodiment of the present invention, the left and right connection arm portions which configure the left and right supporting portions are individually connected to the left and right side walls through the left and right second bending portions and the ends of the left and right connection arm portions are inserted into the left and right openings. The ends of the left and right connection arm portions bent at the left and right second bending portions are inserted into the left and right openings. As a result, the necessity for a unique part for supporting the left and right supporting portions is eliminated, and the number of parts can be reduced. In addition, since the ends of the left and right connection arm portions are inserted into the left and right openings to assemble them, the connection arm portions can be assembled readily to the bottom wall. Consequently, the operability for the assembly of the supporting portions can be enhanced.

According to an embodiment of the present invention, the left and right second bending portions are disposed on the inner side of the left and right seat rails in the vehicle widthwise direction, respectively. By disposing the second bending portions on the inner side of the left and right seat rails in this manner, the left and right second bending portions can be protected by the left and right seat rails, respectively.

According to an embodiment of the present invention, the abutted faces include the abutting portions of the connection arm portions that are molded integrally with the bottom wall. The ends of the left and right connection arm portions are inserted individually into the left and right openings perforated in the bottom wall, and then the abutting portions of the connection arm portions are abutted with the abutted faces. Therefore, the left and right connection arm portions can be fastened to the bottom wall with certainty. Where the left and right connection arm portions are supported with certainty on the bottom wall, the left and right side walls can be supported firmly in a state in which they are inclined at the predetermined angle.

According to an embodiment of the present invention, the left and right harness guides are formed from the left and right inner walls, which configure part of the rear fender and extend in the heightwise direction, and the left and right side walls bent at the left and right first bending portions, respectively. Since the harness guides are formed from the existing bottom wall and left and right side walls, the harness guides can be formed without increasing the number of parts.

According to an embodiment of the present invention, all of the first bending portions and the second bending portions have the reduced thickness from that of the other portions. By forming the first bending portions and the second bending portions so as to have the reduced thickness from that of the other portions, the bending operation for the left and right supporting portions can be carried out readily in comparison with the first bending portions and the second bending portions which have no such reduced thickness.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, an embodiment of the present invention is described in detail.

A working example of the present invention is described with reference to the drawings.

In the following, a configuration of a rear fender as a part attached to a rear portion of a motorcycle and a structure of bending portions which are components of the rear fender are described with reference to FIGS. 1 to 5. Further, a structure when the rear fender having the bending portions described above is attached to a saddle type vehicle and action of the structure are described with reference to FIGS. 6 to 9.

Figure 1:
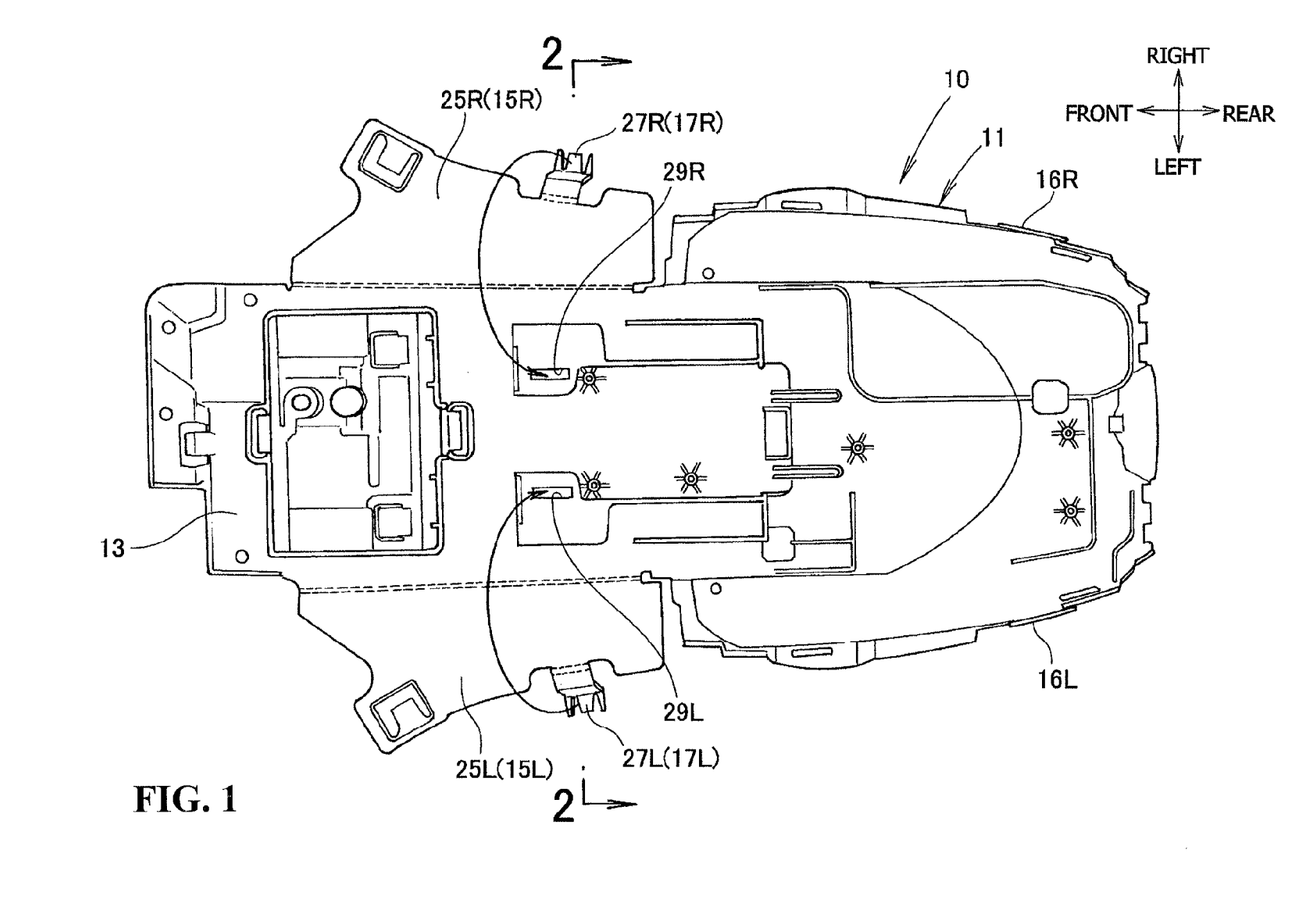
FIG. 1 is a plan view of a rear fender (in a state before a bending process) according to the present invention.

As shown in FIG. 1, the rear fender 10 is produced by bending an interim part 11 in the form of an injection molded plate. In the present working example, the interim part 11 in the form of a plate is a resin part. However, the interim part 11 may otherwise be a metal member of aluminum or the like.

The interim part 11 includes, as principal elements thereof, a bottom wall 13, left and right side pieces 25L and 25R extending outwardly in the vehicle widthwise direction from end portions of the bottom wall 13 at a position of a front half in the longitudinal direction of the bottom wall 13. The interim part 11 further includes left and right rear side walls 16L and 16R extending upwardly on this side of FIG. 1 from end portions of the bottom wall 13 at a position of a rear half in the longitudinal direction behind the left and right side pieces 25L and 25R. On the bottom wall 13, a battery and other electric parts, harness for connecting the electric parts to each other and so forth can be disposed. The left and right side pieces 25L and 25R are bent at a later step to form left and right side walls 15L and 15R, respectively.

The left and right side pieces 25L and 25R include left and right supporting pieces 27L and 27R, respectively. The left and right supporting pieces 27L and 27R are partly projecting portions of the left and right side pieces 25L and 25R and play a role of supporting the left and right side pieces 25L and 25R when the left and right side pieces 25L and 25R are bent, respectively. The left and right supporting pieces 27L and 27R are called left and right supporting portions 17L and 17R when they are bent and support the left and right side walls 15L and 15R, respectively.

Now, the left and right supporting pieces and a structure in the proximity of them are described with reference to FIG. 2.

Figure 2:
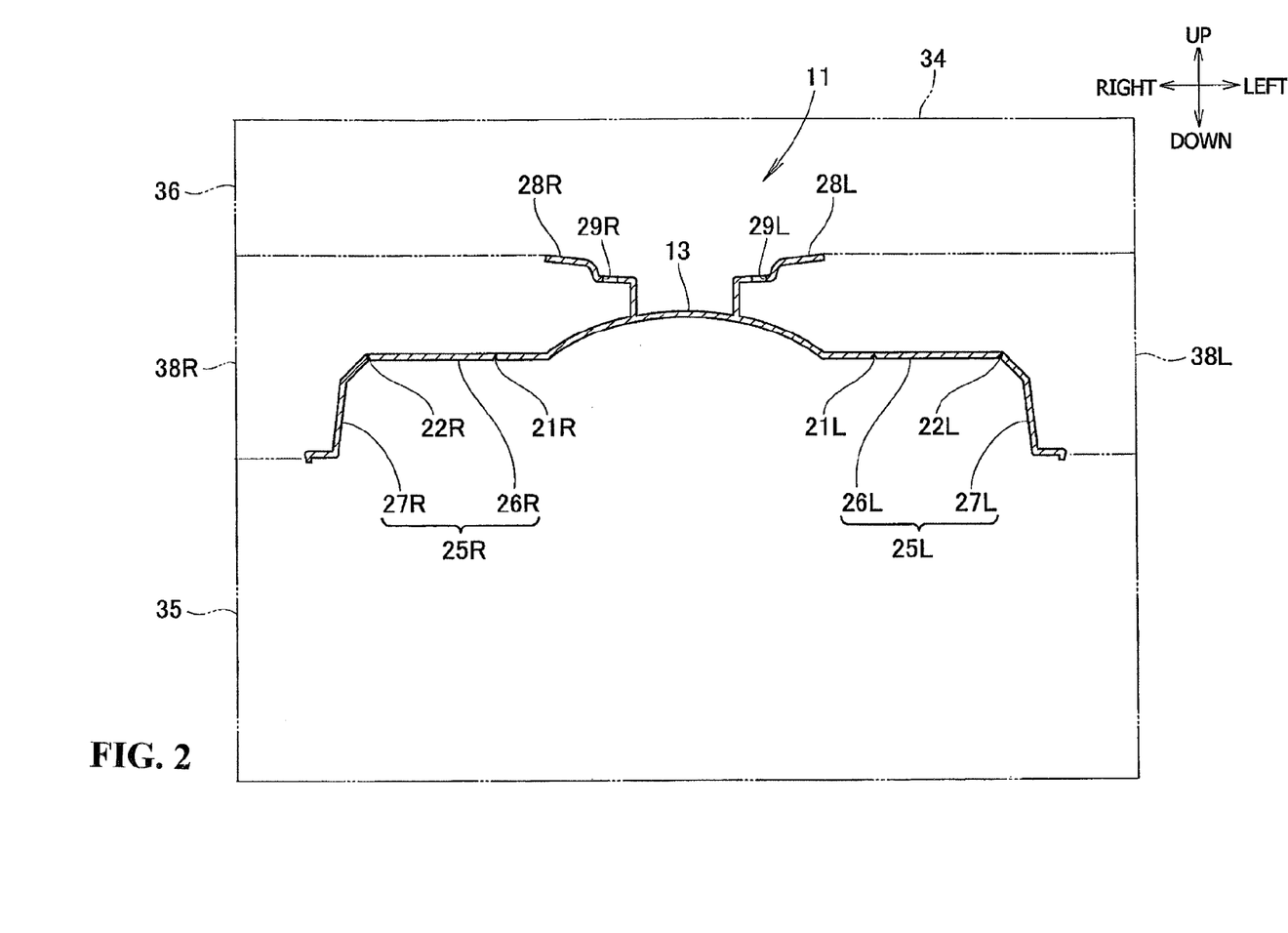
FIG. 2 is a sectional view taken along line 2-2 of FIG. 1.

As shown in FIG. 2, in the interim part 11 in the form of a plate, a left first bending portion 21L as a vulnerable portion which extends in the longitudinal direction of the vehicle is formed on the boundary between the bottom wall 13 and the left side piece 25L. Meanwhile, a right first bending portion 21R as a vulnerable portion which extends in the longitudinal direction of the vehicle is formed on the boundary between the bottom wall 13 and the right side piece 25R. The vulnerable portion signifies a portion at which the interim part 11 has a reduced thickness.

The left and right side pieces 25L and 25R are configured from left and right side piece main bodies 26L and 26R, and left and right supporting pieces 27L and 27R extending downwardly from outer ends of the left and right side piece main bodies 26L and 26R in the vehicle widthwise direction. On the boundary between the left and right side piece main bodies 26L and 26R and the left and right supporting pieces 27L and 27R, left and right second bending portions 22L and 22R as vulnerable portions extending in the longitudinal direction of the vehicle are formed, respectively.

Left and right convex portions 28L and 28R are formed on the bottom wall 13 such that they first extend upwardly and then extend outwardly to the left and the right, respectively. The left and right convex portions 28L and 28R have left and right openings 29L and 29R perforated therein such that ends of the left and right supporting pieces 27L and 27R can be inserted into the openings 29L and 29R, respectively.

The interim part 11 is a part produced by injection molding using a molding metal mold 34 which is configured from a lower mold 35, an upper mold 36 disposed in an opposing relationship to the lower mold 35 and left and right slide molds 38L and 38R disposed for back and forth movement from the left and the right between the lower mold 35 and the upper mold 36. In FIG. 2, spools (injection holes), gates and so forth provided in the metal mold are omitted in FIG. 2.

A process of bending the side pieces is described below with reference to FIGS. 3 and 4.

Figure 3:
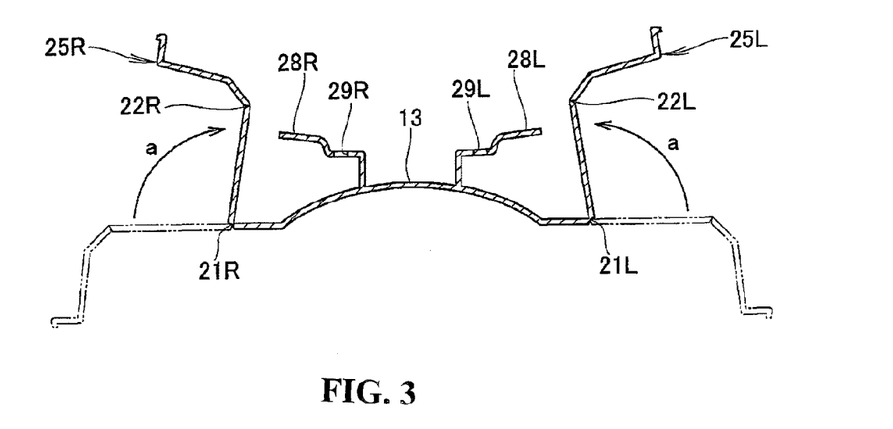
FIG. 3 is a view illustrating that left and right side walls are bent at a first bending portion.

The interim part 11 molded using the molding metal mold 34 is bent as illustrated in FIG. 3. More specifically, the left and right side pieces 25L and 25R are bent in the directions indicated by arrow marks a, a in FIG. 3 at the left and right first bending portions 21L and 21R with respect to the bottom wall 13, respectively.

Figure 4:
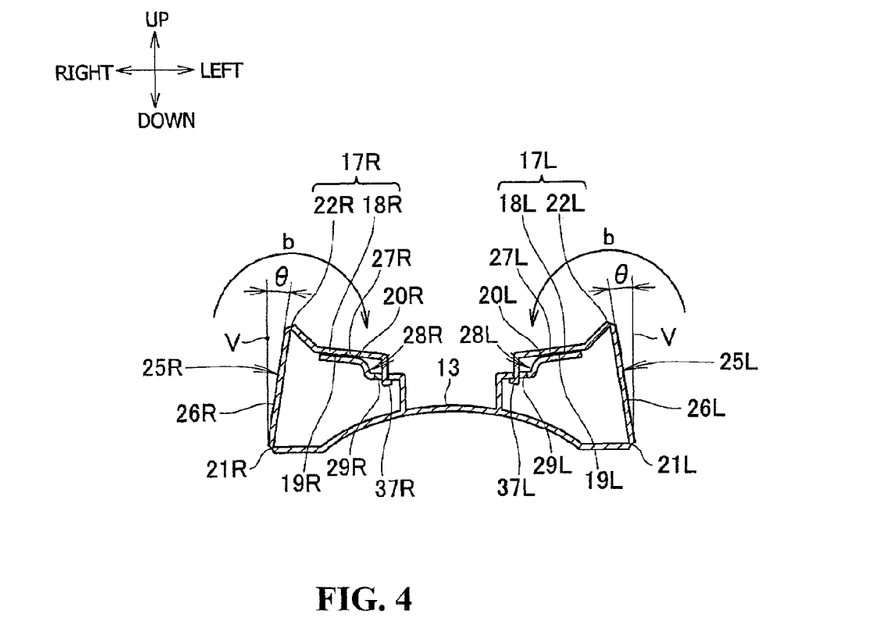
FIG. 4 is a view illustrating that the left and right side walls are bent at a second bending portion.

The interim part 11 as illustrate in FIG. 3 is bent at the left and right first bending portions 21L and 21R and is bent as illustrated in FIG. 4. More specifically, the left and right supporting pieces 27L and 27R are bent in the directions indicated by arrow marks b, b in FIG. 4 at the left and right second bending portions 22L and 22R with respect to the left and right side piece main bodies 26L and 26R of the left and right side pieces 25L and 25R, respectively. Thereupon, ends 37L and 37R of the left and right supporting pieces are inserted into the left and right openings 29L and 29R perforated in the left and right convex portions 28L and 28R, respectively. An assembled state of the left and right side walls is described with reference to FIG. 5.

Figure 5:
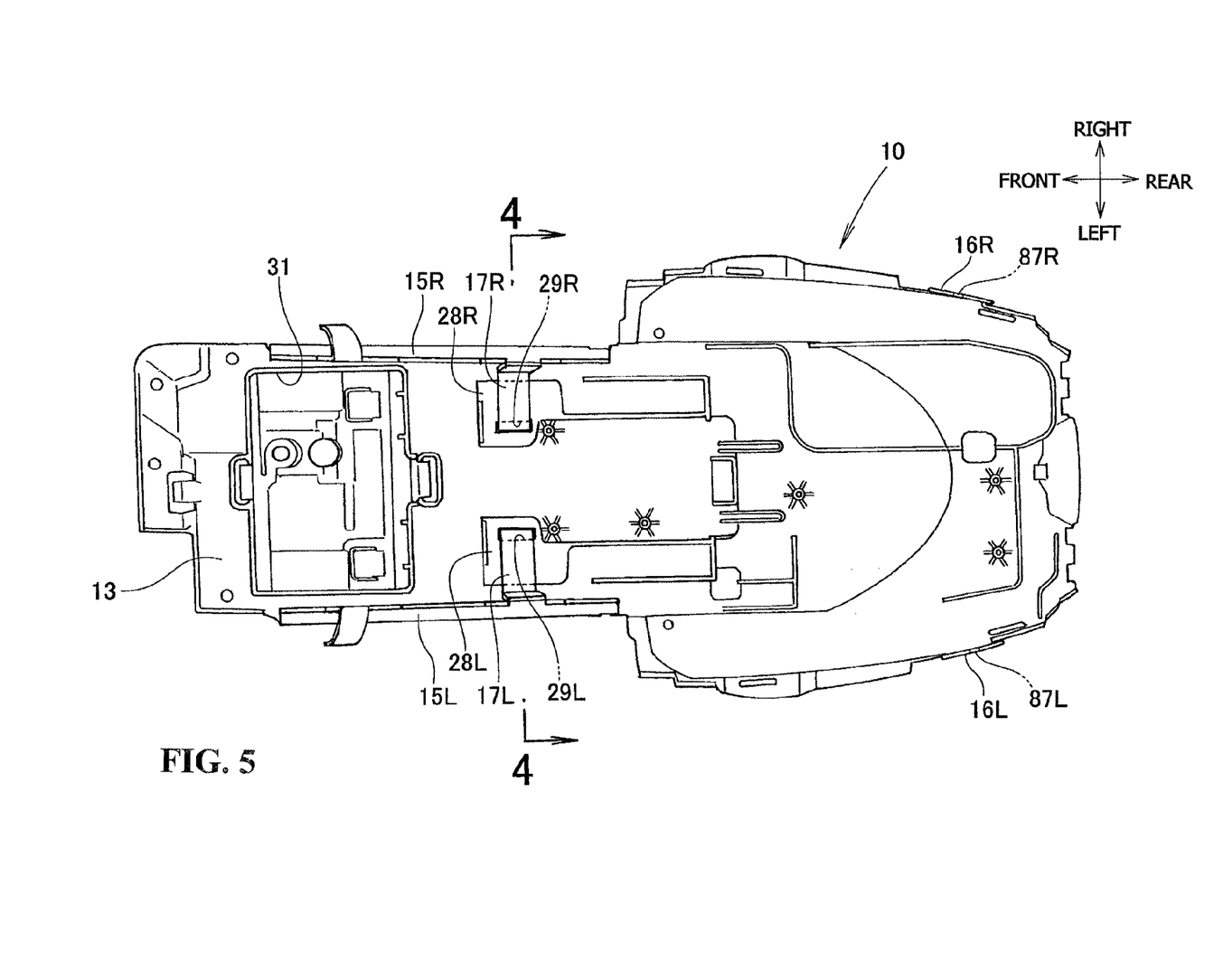
FIG. 5 is a plan view of the rear fender (in a state after the bending process) according to the present invention.
Figure 7:
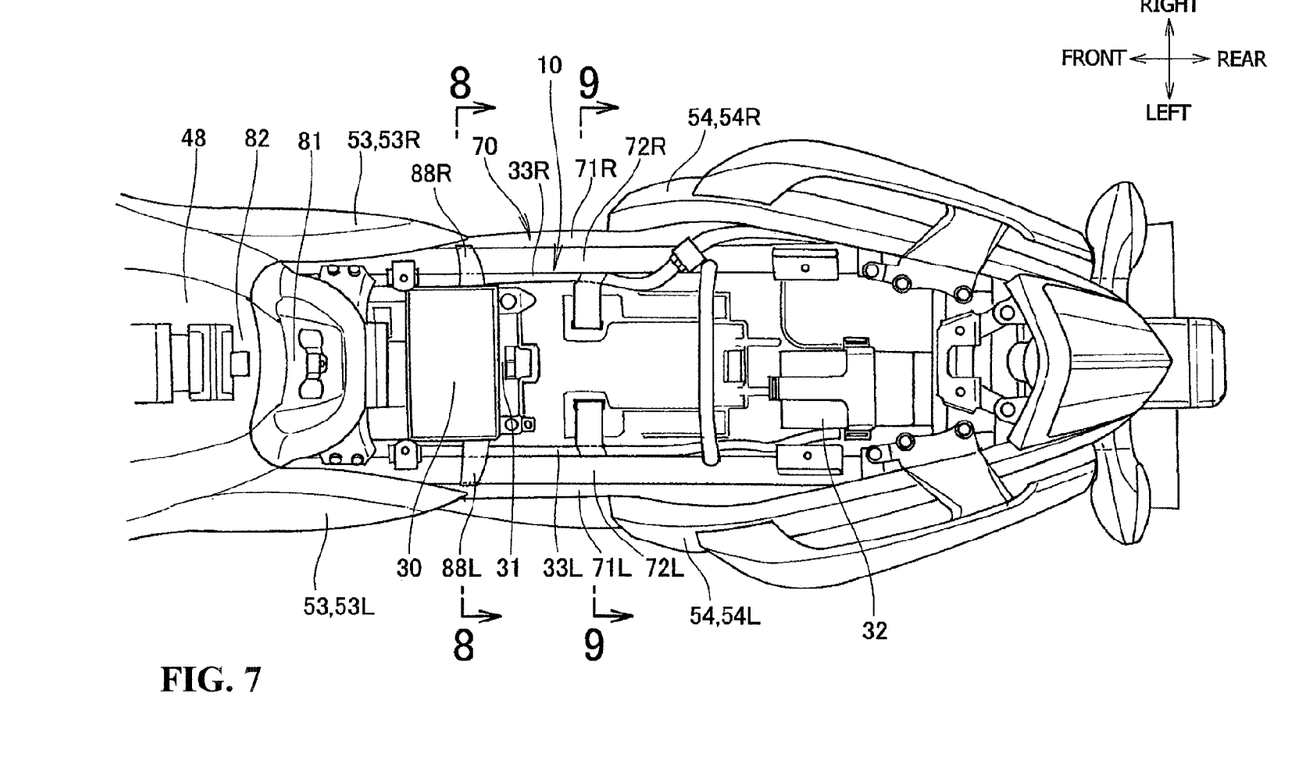
FIG. 7 is a plan view of a rear portion of the vehicle when a seat is removed from the vehicle in a state illustrated in FIG. 6.

As shown in FIG. 5, in the state in which the side walls are bent and assembled, the rear fender 10 includes, as principal components thereof, the bottom wall 13, and the left and right side walls 15L and 15R extending to this side of FIG. 5 from the left and right ends of the bottom wall 13 at a position of a front half in the longitudinal direction of the bottom wall 13. The rear fender 10 further includes, as principal components thereof, the supporting portions 17L and 17R extending from the left and right side walls 15L and 15R, formed integrally with the left and right side walls and supporting the left and right side walls 15L and 15R. The rear fender 10 further includes, as principal components thereof, the left and right rear side walls 16L and 16R extending from the end portions of the bottom wall 13 at a position of a rear half in the longitudinal direction to this side of FIG. 5, namely, in an upward direction. A battery accommodation section 31 in which a battery 30 as illustrated in FIG. 7 is to be accommodated is formed on the bottom wall 13. A sectional view taken along line 4-4 in FIG. 5 is shown in FIG. 4.

In the following description, the left and right side pieces after the bending process are referred to as left and right side walls 15L and 15R, and the left and right supporting pieces are referred to as left and right supporting portions 17L and 17R, respectively.

Referring to FIG. 4, the left and right supporting portions 17L and 17R have left and right connection arm portions 18L and 18R extending from the left and right side walls 15L and 15R, respectively. The left and right supporting portions 17L and 17R further have, between the left and right connection arm portions 18L and 18R and the left and right side walls 15L and 15R, left and right second bending portions 22L and 22R which extend in the longitudinal direction of the vehicle and at which the left and right connection arm portions 18L and 18R can be bent with respect to the left and right side walls 15L and 15R, respectively.

Ends of the left and right connection arm portions (ends 37L and 37R of the left and right supporting pieces) are inserted into the left and right openings 29L and 29R formed in the bottom wall 13, respectively. The inserted left and right connection arm portions 18L and 18R support the left and right side walls 15L and 15R in a state in which the left and right side walls 15L and 15R are inclined inwardly at a predetermined inclination angle θ with respect to a vertical line V. The ends 37L and 37R of the left and right supporting pieces engage with the openings 29L and 29R perforated in the bottom wall 13, respectively. The left and right side walls 15L and 15R are inclined inwardly by the inclination angle θ with respect to the vertical line V, respectively.

Abutting portions 19L and 19R in the form of a flat face are formed on the left and right connection arm portions 18L and 18R, respectively, and abutted faces 20L and 20R with which the abutting portions 19L and 19R abut in a plane, respectively, are formed integrally on the bottom wall 13. The abutted faces 20L and 20R are provided with which the abutting portions 19L and 19R abut are formed on the convex portions 28L and 28R of the bottom wall 13, respectively. Similarly, also the left and right openings 29L and 29R are provided into which the ends of the left and right connection arm portions (ends 37L and 37R of the left and right supporting pieces) are formed on the convex portions 28L and 28R of the bottom wall 13, respectively. The left and right openings 29L and 29R are perforated on the inner side of the abutted faces 20L and 20R formed on the convex portions 28L and 28R.

The ends of the left and right connection arm portions (ends 37L and 37R of the left and right supporting pieces) are inserted in the left and right openings 29L and 29R perforated in the convex portions 28L and 28R of the bottom wall 13, respectively. Further, the abutting portions 19L and 19R of the connection arm portions are abutted in a plane with the abutted faces 20L and 20R, respectively. Therefore, the left and right connection arm portions 18L and 18R can be fastened with certainty to the bottom wall 13. In addition, the left and right openings 29L and 29R are perforated on the inner side of the abutted faces 20L and 20R formed on the convex portions 28L and 28R, respectively.

While the load of the connection arm portions 18L and 18R is supported in a plane by the abutted faces 20L and 20R, the ends of the connection arm portions 18L and 18R are engaged with the left and right openings 29L and 29R perforated on the inner side of the abutted faces 20L and 20R, respectively. Therefore, the connection arm portions 18L and 18R can be supported with a higher degree of certainty by a simple and convenient structure. Where the left and right connection arm portions 18L and 18R are supported with certainty on the bottom wall 13, the left and right side walls 15L and 15R can be held in an inclined relationship by a predetermined angle by a simple and convenience structure.

The first bending portions 21L and 21R and the second bending portions 22L and 22R are vulnerable portions having a reduced thickness with respect to the other portions. Since the first bending portions 21L and 21R and the second bending portions 22L and 22R are formed as vulnerable portions having a reduced thickness in this manner, the bending process of the left and right supporting portions 17L and 17R can be carried out readily in comparison with the first bending portions 21L and 21R and the second bending portions 22L and 22R which have no such reduced thickness.

Now, a motorcycle to which the rear fender described above is attached is described.

Figure 6:
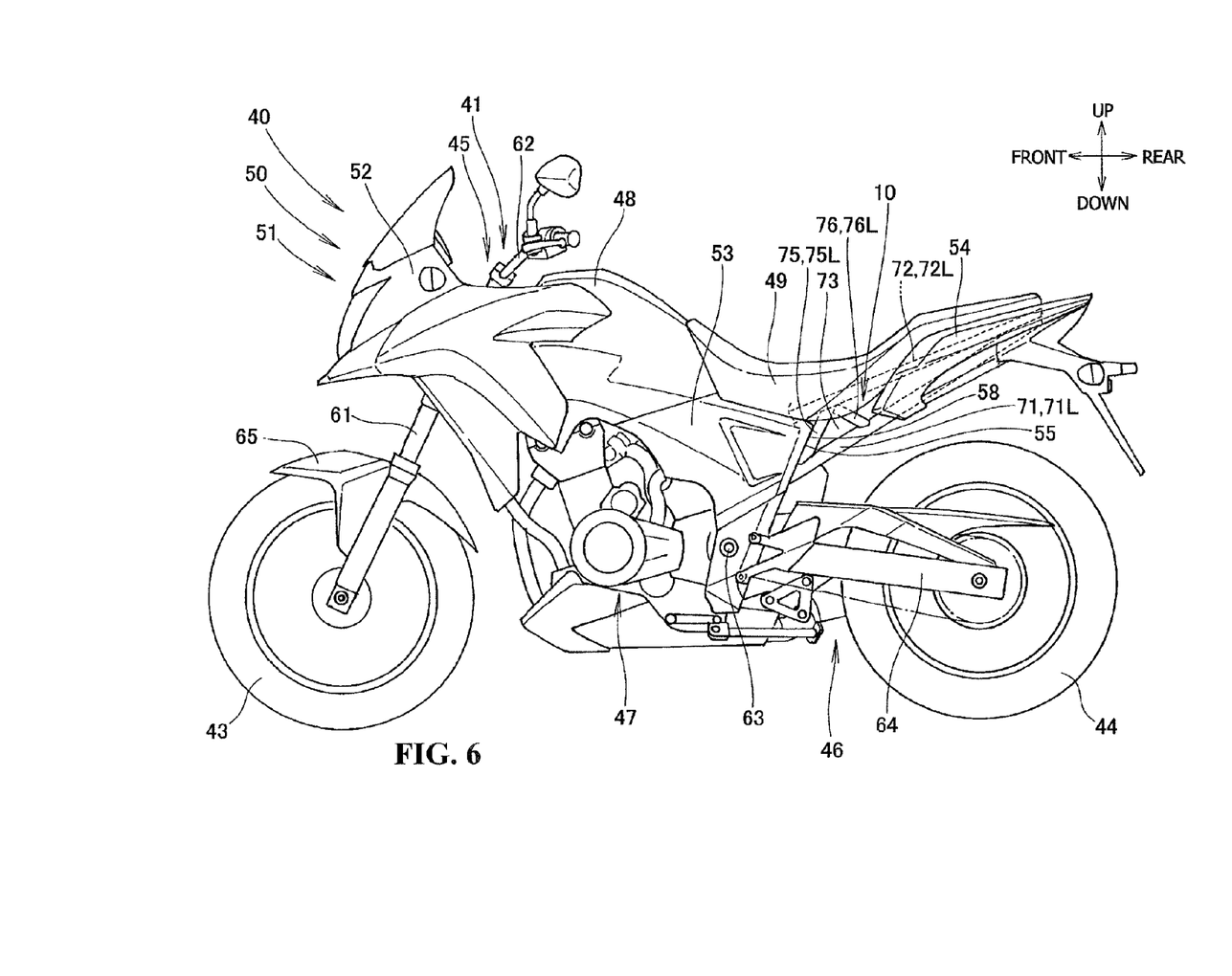
FIG. 6 is a left side elevational view of a motorcycle to which the rear fender according to the present invention is attached.

As shown in FIG. 6, the motorcycle 40 includes, as principal components thereof, a vehicle body frame 41, a front wheel steering section 45 provided at a front end of the vehicle body frame 41 and supporting a front wheel 43 thereon. The motorcycle 40 further includes a rear wheel suspending section 46 extending rearwardly of the vehicle from a lower portion of an intermediate portion of the vehicle body frame 41 in the longitudinal direction and supporting a rear wheel 44. The motorcycle 40 further includes an engine 47 suspended on the vehicle body frame 41 between the front wheel steering section 45 and the rear wheel suspending section 46, and a fuel tank 48 attached to the vehicle body frame 41 above the engine 47. The motorcycle 40 further includes a seat 49 provided continuously to the rear of the fuel tank 48 on which a rider is seated. In the figures, "up," "down," "front," "back," "left" and "right" represent directions as viewed from the rider who rides on the motorcycle.

A vehicle body 50 including the vehicle body frame 41 is covered with a vehicle body cover 51. The vehicle body cover 51 is configured from a front cowl 52 which covers a front portion of the vehicle body from above, and a middle cowl 53 extending rearwardly of the vehicle above and on the opposite sides of the vehicle body continuously from the front cowl 52. The vehicle body cover 51 is configured further from a rear cowl 54 which covers a rear portion of the vehicle body 50 from the opposite sides.

The front wheel steering section 45 has a front fork 61 attached for pivotal motion at a front end of the vehicle body frame 41 and supporting the front wheel 43 thereon, and a handlebar 62 attached to an upper end of the front fork 61 for being operated for steering by a rider. The rear wheel suspending section 46 has a swing arm 64 attached to a pivot shaft 63 which extends in the vehicle widthwise direction on the vehicle body frame 41. The swing arm 64 extends rearwardly and supports the rear wheel 44 at a rear end thereof. The swing arm 64 is provided for rocking motion around the pivot shaft 63.

A front fender 65 for avoiding mud splashed by the front wheel 43 is attached to the front fork 61 above the front wheel 41 The rear fender 10 for avoiding mud splashed by the rear wheel 44 is attached to a rear portion of the vehicle body frame 41 above the rear wheel 44.

Now, a structure wherein the rear fender is partly exposed as viewed in a side elevation of the vehicle is described.

An exposition section 73 is formed below the seat 49 between the middle cowl 53 and the rear cowl 54 such that a support frame 71 and the rear fender 10 which is provided inwardly of the support frame 71 in the vehicle widthwise direction are exposed through the exposition section 73. Since the exposition section 73 which is not covered with the vehicle body cover 51 is provided between the middle cowl 53 and the rear cowl 54 in the longitudinal direction of the vehicle, a reduction in the weight of the vehicle body 50 can be anticipated.

Further, the support frame 71, a first sub frame 75 and a second sub frame 76 hereinafter described are disposed in the exposition section 73 such that they can be visually recognized. Since the support frame 71, first sub frame 75 and second sub frame 76 are disposed for visual recognition in the exposition section 73, the appearance of the exposition section 73 can be enhanced.

Now, a positional relationship between the middle cowl 53 and the rear fender 10 is described.

A rib 58 extends inwardly in the vehicle widthwise direction from a rear edge 55 of the middle cowl 53 in the longitudinal direction of the vehicle toward a side wall of the rear fender 10 disposed on the inner side in the widthwise direction with respect to the middle cowl 53. By providing such a rib 58 as just described on the middle cowl 53, the gap between the middle cowl 53 and the rear fender 10 can be reduced. As a result, invasion of water and so forth from the outside into a gap between the middle cowl 53 and the rear fender 10 can be prevented.

Now, a state of a rear portion of the vehicle as viewed from above when the seat is removed is described.

As shown in FIG. 7, a rear frame 70 extends rearwardly in the longitudinal direction of the vehicle, and the rear fender 10 is attached to the rear frame 70. A battery 30 is accommodated in a battery accommodation section 31 formed at a front portion of the rear fender 10, and an electric part 32 is attached to a rear portion of the rear fender 10. Harnesses 33L and 33R extend along the left and right ends of the bottom wall 13, respectively.

When the seat 49 as illustrated in FIG. 6 is removed, a location 82 of a rear portion of the fuel tank at a central portion in the vehicle widthwise direction other than a location 81 at which the seat 49 is fitted from above is formed in a convex shape protruding upwardly. Since the location 82 of the rear portion of the fuel tank at a central portion in the vehicle widthwise direction is formed in a convex shape, a fuel volume that can be reserved in the fuel tank 48 can be assured sufficiently.

Figure 8:
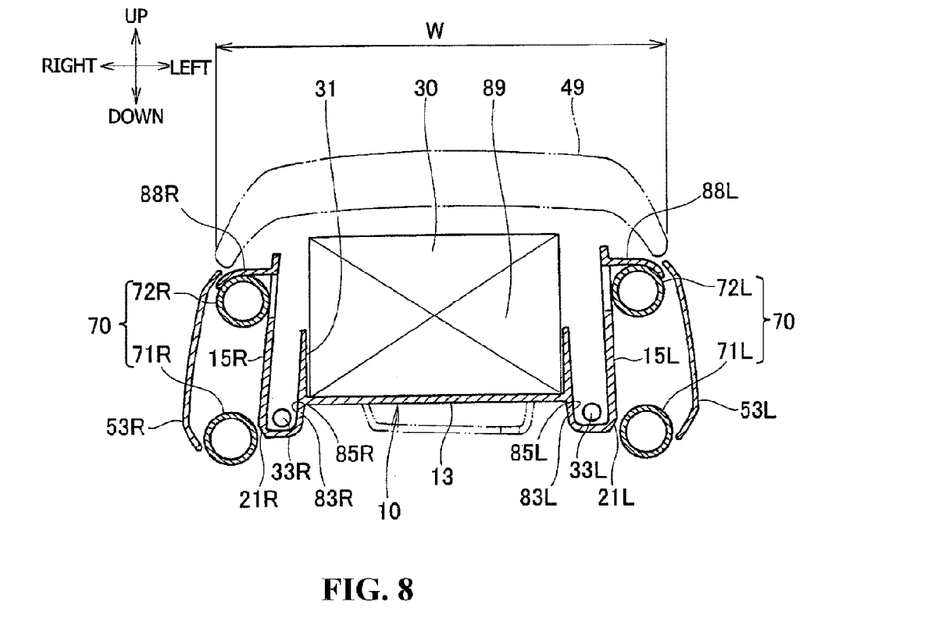
FIG. 8 is a sectional view taken along line 8-8 of FIG. 7.

As shown in FIG. 8, the rear frame 70 includes, as principal components thereof, a pair of left and right seat rails 72L and 72R for supporting the seat 49 on which a rider is to be seated, and a pair of left and right support frames 71L and 71R disposed below and on the outer sides in the vehicle widthwise direction of the paired left and right seat rails 72L and 72R, respectively.

Referring to FIG. 6, the paired left and right support frames 71 (71L and 71R) support the paired left and right seat rails 72 (72L and 72R). Left and right first sub frames 75 (75L and 75R) extend between the left and right seat rails 72L and 72R and the left and right support frames 71L and 71R. Left and right second sub frames 76 (76L and 76R) extend between the left and right seat rails 72L and 72R and the left and right support frames 71L and 71R at positions behind the left and right first sub frames 75L and 75R. In other words, the rear fender 10 is provided on the rear frame 70.

The support frames 71 are configured from the left support frame 71L and the right support frame 71R, and the seat rails 72 are configured from the left seat rail 72L and the right seat frame 72R. The first sub frames 75 are configured from the left first sub frame 75L and the right first sub frame 75R, and the second sub frames 76 are configured from the left second sub frame 76L and the right second sub frame 76R.

Referring to FIG. 8, the rear fender 10 has the bottom wall 13 disposed on the inner side of the rear frame 70 in the vehicle widthwise direction, and the left and right side walls 15L and 15R extending upwardly from the bottom wall 13. An accommodation space 89 for accommodating a part therein is formed from the bottom wall 13 and the left and right side walls 15L and 15R. Further, the left and right first bending portions 21L and 21R at which the left and right side walls 15L and 15R can be bent with respect to the bottom wall 13 are formed between the bottom wall 13 and the left and right side walls 15L and 15R, respectively.

The left and right side walls 15L and 15R are inclined inwardly upwards along the inner side of the rear frame 70. The left and right first bending portions 21L and 21R are disposed on the inner side of the left and right support frames 71L and 71R in the vehicle widthwise direction, respectively.

By disposing the first bending portions 21 L and 21 R on the inner side of the left and right support frames 71L and 71R, the left and right first bending portions 21L and 21R can be protected by the left and right support frames 71L and 71R.

Figure 9:
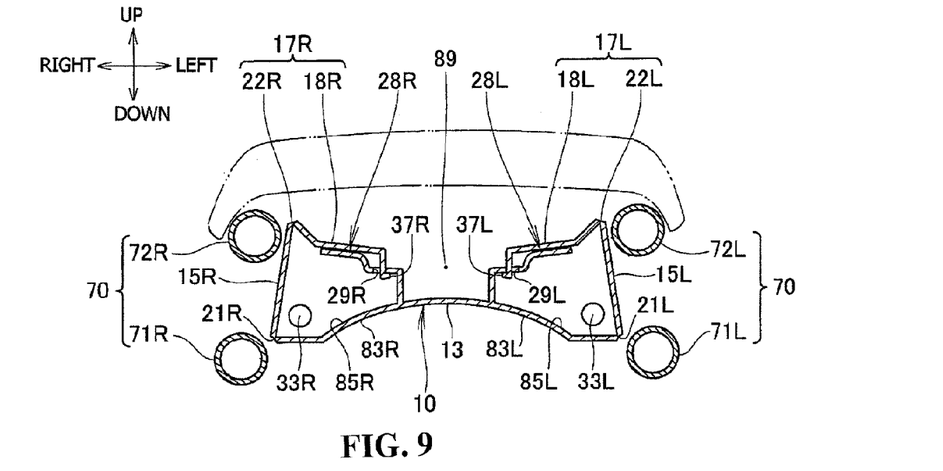
FIG. 9 is a sectional view taken along line 9-9 of FIG. 7.

As shown in FIG. 9, the left and right second bending portions 22L and 22R are disposed on the inner side of the left and right seat rails 72L and 72R in the vehicle widthwise direction. By disposing the left and right second bending portions 22L and 22R on the inner side of the left and right seat rails 72L and 72R in this manner, the left and right second bending portions 22L and 22R can be protected by the left and right seat rails 72L and 72R, respectively.

Referring to FIG. 8, the left and right side walls 15L and 15R are plate-like members extending in the longitudinal direction of the vehicle. Left and right inner walls 83L and 83R are formed on the rear fender 10 on the inner side of the left and right first bending portions 21L and 21R in the vehicle widthwise direction in such a manner so as to extend in the heightwise direction and extend in the longitudinal direction of the vehicle. Left and right harness guides 85L and 85R for guiding the harnesses 33L and 33R are formed from the left and right inner walls 83L and 83R and the side walls 15L and 15R bent at the left and right first bending portions 21L and 21R, respectively.

The left and right harness guides 85L and 85R are formed from the left and right inner walls 83L and 83R extend in the heightwise direction with the left and right side walls 15L and 15R bent at the left and right first bending portions 21L and 21R, respectively. Since the harness guides 85L and 85R are formed from the existing bottom wall 13 and left and right side walls 15L and 15R in this manner, the harness guides 85L and 85R can be formed without increasing the number of parts.

Referring to FIGS. 8 and 9, the bottom wall 13 is a region extending from the center in the vehicle widthwise direction to the left and right first bending portions 21L and 21R and includes uneven portions such as the left and right convex portions 28L and 28R and inner walls 83L and 83R.

Now, an attachment structure of the rear fender to the vehicle body frame is described.

Referring to FIG. 5, the left and right rear side walls 16L and 16R have fastening holes 87L and 87R perforated therein such that fastening members attached to the left and right seat rails 72L and 72R as illustrated in FIG. 7 are fitted in the fastening holes 87L and 87R, respectively. The rear fender 10 is fastened to the rear frame 70 as illustrated in FIG. 8 making use of the fastening holes 87L and 87R. Referring to FIG. 8, left and right hooking portions 88L and 88R extend outwardly in the vehicle widthwise direction from the left and right side walls 15L and 15R in such a manner as to hook the left and right seat rails 72L and 72R, respectively.

Referring also to FIG. 7, the left and right hooking portions 88L and 88R provided at a front portion of the rear fender 10 hook the left and right seat rails 72L and 72R from above, and the left and right rear side walls 16L and 16R provided at a rear portion of the rear fender 10 are fastened to the rear frame 70 to attach the rear fender 10 to the rear frame 70.

Action of the rear portion structure of the saddle type vehicle described above is described below.

Referring to FIG. 8, the length (distance) in the vehicle widthwise direction of (between) the seat rails 72L and 72R disposed above the support frames 71L and 71R is set smaller than the length (distance) in the vehicle widthwise direction of (between) the support frames 71L and 71R. In other words, the seat rails 72L and 72R are disposed on the inner side with respect to the support frames 71L and 71R. Therefore, the seat width (W) can be reduced from that in an alternative case wherein the seat rails 72L and 72R are disposed with an equal width with that of the support frames 71L and 71R. Where the seat width (W) is reduced, the foot grounding property of the rider is enhanced.

In addition, the accommodation space 89 for accommodating parts including the harnesses 33L and 33R is formed from the bottom wall 13 and the left and right side walls 15L and 15R in the rear fender 10. The left and right side walls 15L and 15R are disposed such that they extend along the inner side of the rear frame 70 and are inclined inwardly and upwardly. In other words, the left and right side walls 15L and 15R are inclined outwardly and downwardly and have a width increasing downwardly. Therefore, the accommodation space 89 for parts can be widened in comparison with that in an alternative case wherein the left and right side walls 15L and 15R are not inclined outwardly. As a result, the foot grounding property is improved and the accommodation space for parts can be made wide.

Further, the accommodation space 89 for parts and so forth is configured in the rear fender 10 by bending the left and right side walls 15L and 15R at the left and right first bending portions 21L and 21R which serve as bending portions such that the left and right side walls 15L and 15R are inclined inwardly in the vehicle widthwise direction with respect to the bottom wall 13. The accommodation space 89 for parts is a space opening upwardly and formed between the bottom wall 13 and the left and right side walls 15L and 15R.

The left and right first bending portions 21L and 21R are vulnerable portions at which the thickness is reduced from the other portions. Since the accommodation space 89 can be formed by bending the left and right side walls 15L and 15R at the left and right first bending portions 21L and 21R with respect to the bottom wall 13, the molding metal mold 34 as illustrated in FIG. 2 of the rear fender 10 can be simplified. In addition, since the bottom wall 13 and the left and right side walls 15L and 15R are molded integrally, the assembling performance of the rear fender 10 can be enhanced and a reduction in the cost of parts can be anticipated.

Referring to FIG. 9, the left and right supporting portions 17L and 17R are formed integrally on the left and right side walls 15L and 15R such that they extend to the left and right convex portions 28L and 28R formed on the bottom wall 13 and engage with the left and right convex portions 28L and 28R formed on the bottom wall 13, respectively. The left and right side walls 15L and 15R are supported at a predetermined inclination angle with respect to the bottom wall 13 by the left and right supporting portions 17L and 17R. By the left and right supporting portions 17L and 17R extending integrally from the left and right side walls 15L and 15R, respectively, the left and right side walls 15L and 15R can be supported in a state in which they are inclined at the predetermined angle inwardly in the vehicle widthwise direction without increasing the number of parts.

The left and right connection arm portions 18L and 18R extend from the left and right side walls 15L and 15R, respectively. Since the left and right side walls 15L and 15R are integrated with the left and right connection arm portions 18L and 18R, respectively, the number of parts can be reduced. Further, the ends of the left and right connection arm portions, ends 37L and 37R of the left and right supporting pieces, are inserted into the left and right openings 29L and 29R, respectively, formed in the bottom wall 13 to assemble the connecting arm portions. As a result, the connection arm portions 18L and 18R can be assembled readily to the bottom wall 13.

It is to be noted that, while, in the embodiment, the present invention is applied to a motorcycle, it can be applied also to a saddle type three-wheeled vehicle and may be applied to general saddle type vehicles.

The present invention is suitably applied to a motorcycle which includes a rear fender having a part accommodation space.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A rear portion structure for a saddle vehicle comprising:
a rear frame includes a pair of left and right seat rails supporting a seat on which a rider is to be seated and a pair of left and right support frames disposed below and on the outer sides in a vehicle widthwise direction with respect to the paired left and right seat rails and supporting the paired left and right seat rails thereon; and
a rear fender for avoiding mud splashed by a rear wheel is provided on the rear frame;
the rear fender has a bottom wall disposed on the inner side of the rear frame in the vehicle widthwise direction and left and right side walls extending upwardly from the bottom wall, respectively, an accommodation space for accommodating a part therein being formed from the bottom wall and the left and right side walls, left and right first bending portions individually extending in a longitudinal direction of the vehicle wherein the left and right side walls can individually be bent with respect to the bottom wall and are formed between the bottom wall and the left and right side walls; and the left and right side walls are inclined inwardly and upwardly along the inner side of the rear frame.

2. The rear portion structure for a saddle vehicle according to claim 1, wherein the left and right first bending portions are disposed on the inner side in the vehicle widthwise direction with respect to the left and right support frames, respectively.

3. The rear portion structure for a saddle vehicle according to claim 1, wherein left and right supporting portions extend to and engage with the bottom wall for supporting the left and right side walls at a predetermined inclination angle, said left and right supporting portions being formed integrally on the left and right side walls.

4. The rear portion structure for a saddle vehicle according to claim 2, wherein left and right supporting portions extend to and engage with the bottom wall for supporting the left and right side walls at a predetermined inclination angle, said left and right supporting portions being formed integrally on the left and right side walls.

5. The rear portion structure for a saddle vehicle according to claim 3, wherein the left and right supporting portions have left and right connection arm portions connected to the left and right side walls and extending from the left and right side walls, respectively, and left and right second bending portions individually extend in the longitudinal direction of the vehicle between the left and right connection arm portions and the left and right side walls and at which the left and right connection arm portions can be bent with respect to the left and right side walls, respectively, and ends of the left and right connection arm portions are inserted in left and right openings formed in the bottom wall.

6. The rear portion structure for a saddle vehicle according to claim 5, wherein the left and right second bending portions are disposed on the inner side of the left and right seat rails in the vehicle widthwise direction.

7. The rear portion structure for a saddle vehicle according to claim 5, wherein abutting portions each in the form of a flat face are formed on the left and right connection arm portions; and abutted faces for abutting in a plane with the abutting portions are integrally formed on the bottom wall.

8. The rear portion structure for a saddle vehicle according to claim 6, wherein abutting portions each in the form of a flat face are formed on the left and right connection arm portions; and abutted faces for abutting in a plane with the abutting portions are integrally formed on the bottom wall.

9. The rear portion structure for a saddle vehicle according to claim 1, wherein the left and right side walls are plate-like members individually extending in the longitudinal direction of the vehicle;

left and right inner walls, extending in the heightwise direction and extending in the longitudinal direction of the vehicle, are formed on the rear fender on the inner side in the vehicle widthwise direction with respect to the first bending portions; and left and right harness guides for individually guiding electric cables are formed from the left with right inner walls and the left and right side walls being bent at the left and right first bending portions, respectively.

10. The rear portion structure for a saddle vehicle according to claim 2, wherein the left and right side walls are plate-like members individually extending in the longitudinal direction of the vehicle;

left and right inner walls, extending in the heightwise direction and extending in the longitudinal direction of the vehicle, are formed on the rear fender on the inner side in the vehicle widthwise direction with respect to the first bending portions; and left and right harness guides for individually guiding electric cables are formed from the left with right inner walls and the left and right side walls being bent at the left and right first bending portions, respectively.

11. The rear portion structure for a saddle vehicle according to claim 3, wherein the left and right side walls are plate-like members individually extending in the longitudinal direction of the vehicle;

left and right inner walls, extending in the heightwise direction and extending in the longitudinal direction of the vehicle, are formed on the rear fender on the inner side in the vehicle widthwise direction with respect to the first bending portions; and left and right harness guides for individually guiding electric cables are formed from the left with right inner walls and the left and right side walls being bent at the left and right first bending portions, respectively.

12. The rear portion structure for a saddle vehicle according to claim 5, wherein the left and right side walls are plate-like members individually extending in the longitudinal direction of the vehicle;

left and right inner walls, extending in the heightwise direction and extending in the longitudinal direction of the vehicle, are formed on the rear fender on the inner side in the vehicle widthwise direction with respect to the first bending portions; and left and right harness guides for individually guiding electric cables are formed from the left with right inner walls and the left and right side walls being bent at the left and right first bending portions, respectively.

13. The rear portion structure for a saddle vehicle according to claim 5, wherein all of the first bending portions and the second bending portions have a reduced thickness relative to the other portions.

14. The rear portion structure for a saddle vehicle according to claim 6, wherein all of the first bending portions and the second bending portions have a reduced thickness relative to the other portions.

15. The rear portion structure for a saddle vehicle according to claim 7, wherein all of the first bending portions and the second bending portions have a reduced thickness relative to the other portions.

16. A rear portion structure for a saddle vehicle comprising:

a pair of left and right seat rails for supporting a seat and a pair of left and right support frames disposed below and on the outer sides in a vehicle widthwise direction with respect to the pair of left and right seat rails, said pair of left and right support frames supporting the pair of left and right seat rails and forming a rear frame;

a rear fender operatively connected to the rear frame, said rear fender including a bottom wall disposed on the inner side of the rear frame in the vehicle widthwise direction and left and right side walls extending upwardly from the bottom wall, respectively;

an accommodation space for accommodating a part therein being formed from the bottom wall and the left and right side walls, left and right first bending portions individually extending in a longitudinal direction of the vehicle wherein the left and right side walls can individually be bent with respect to the bottom wall and are formed between the bottom wall and the left and right side walls; and said left and right side walls being inclined inwardly and upwardly along the inner side of the rear frame.

17. The rear portion structure for a saddle vehicle according to claim 16, wherein the left and right first bending portions are disposed on the inner side in the vehicle widthwise direction with respect to the left and right support frames, respectively.

18. The rear portion structure for a saddle vehicle according to claim 16, wherein left and right supporting portions extend to and engage with the bottom wall for supporting the left and right side walls at a predetermined inclination angle, said left and right supporting portions being formed integrally on the left and right side walls.

19. The rear portion structure for a saddle vehicle according to claim 18, wherein the left and right supporting portions have left and right connection arm portions connected to the left and right side walls and extending from the left and right side walls, respectively, and left and right second bending portions individually extend in the longitudinal direction of the vehicle between the left and right connection arm portions and the left and right side walls and at which the left and right connection arm portions can be bent with respect to the left and right side walls, respectively, and ends of the left and right connection arm portions are inserted in left and right openings formed in the bottom wall.

20. The rear portion structure for a saddle vehicle according to claim 19, wherein the left and right second bending portions are disposed on the inner side of the left and right seat rails in the vehicle widthwise direction.

* * * * *